United States Patent
Preston

[11] Patent Number: 5,942,148
[45] Date of Patent: Aug. 24, 1999

[54] NITRIDE COMPACTS

[76] Inventor: Kenneth G. Preston, 54 Adams St., Foxboro, Mass. 02035

[21] Appl. No.: 08/997,845

[22] Filed: Dec. 24, 1997

[51] Int. Cl.$^6$ .................................................. C04B 35/58
[52] U.S. Cl. ............................... 252/62.3 GA; 501/96.1; 264/676; 264/668
[58] Field of Search ................. 501/96.4, 96.1, 501/98.1; 252/62.36; 264/676, 668

[56] References Cited

U.S. PATENT DOCUMENTS

| | | | |
|---|---|---|---|
| 3,078,232 | 2/1963 | Wentorf, Jr. | 252/62.3 GA |
| 3,216,942 | 11/1965 | Wentorf, Jr. | 252/62.3 GA |
| 4,585,706 | 4/1986 | Takeda et al. | 501/98.4 |
| 4,778,778 | 10/1988 | Mallia et al. | 501/98.4 |
| 4,803,183 | 2/1989 | Schwetz et al. | 501/98.4 |
| 4,838,935 | 6/1989 | Dunlop et al. | 75/230 |
| 5,116,589 | 5/1992 | Hoenig | 501/96.4 |
| 5,210,051 | 5/1993 | Carter, Jr. | 437/107 |
| 5,334,277 | 8/1994 | Nakamura | 117/102 |
| 5,480,532 | 1/1996 | Schlott et al. | 204/298.13 |
| 5,536,485 | 7/1996 | Kume et al. | 423/446 |
| 5,633,192 | 5/1997 | Houstavias et al. | 438/46 |
| 5,650,201 | 7/1997 | Tompa | 427/523 |
| 5,657,335 | 8/1997 | Rubin et al. | 374/44 |

*Primary Examiner*—Melissa Bonner
*Attorney, Agent, or Firm*—Pittas / Koenig; Philip G. Koenig

[57] ABSTRACT

A hot press method for the fabrication of doped or undoped gallium nitride compacts, and of other nitride compacts, employs as a starting material a powder mixture of the selected nitride and of a nitrogen rich salt. A preferred method for fabricating gallium nitride compacts employs ammonium carbonate powder as a starting material additive. In the course of the hot press operation, the endothermic volatilization of ammonium carbonate at a temperature below the disassociation temperature threshold of gallium nitride acts to cool the gallium nitride and also releases free nitrogen radicals that are available to replace any nitrogen lost by gallium nitride molecules through disassociation. The resulting compacts are substantially free of gallium metal, voids, or contaminants, and have a density exceeding 75% of theoretical maximum density.

26 Claims, 1 Drawing Sheet

Diffraction pattern of GaN deposited onto c-sapphire by pulsed laser deposition

NITRIDE COMPACTS

BACKGROUND OF THE INVENTION

This Invention relates to methods for the fabrication of gallium nitride compacts and other nitride compacts suitable for use as sputtering targets. Gallium nitride solid state devices are uniquely suited for the manufacture of "blue" light emitting diodes (LEDs) and of "blue light" lasers, including miniaturized lasers suitable for use in recording data, music or video signals onto compact discs. Microelectronic devices incorporating gallium nitride components can operate over broad temperature ranges, making them particularly suitable as electronic components in engines, furnaces and other equipment that operates at high temperatures. These developments have greatly increased the need for low cost, efficient methods of preparing gallium nitride source materials in a form suitable for use in established semiconductor fabrication techniques and apparatus.

Many different techniques and types of apparatus are used in the fabrication of electronic devices made of semiconductor materials. An important category of techniques, called sputter deposition, itself comprises several distinct methods including DC reactive sputtering and laser ablation. A common feature of these "sputtering" techniques is that a target, composed of a material to be deposited on a substrate, is bombarded with an energetic beam. This bombardment dislodges atoms or molecules of the target material from the surface of the target, and directs them to the surface of a nearby substrate, onto which the target material is deposited. The sputtering target is typically a wafer-shaped compact, produced using powder metallurgy compaction methods such as hot pressing, in which a powder mixture is subjected to a combination of high temperature and mechanical pressure to sinter the material into a bonded compact.

Gallium nitride targets usable in sputtering apparatus have heretofore not been available, however, for lack of any known method to manufacture a gallium nitride target usable for semiconductor applications. Efforts to prepare such gallium nitride targets using conventional powder metallurgy methods have been unsuccessful, in that portions of the gallium nitride starting material dissociates into gallium metal, nitrogen gas and gallium oxide, and the resulting targets generally demonstrate an unacceptably low density, with excessive porosity and contamination.

The failure of past attempts to prepare usable gallium nitride sputtering targets is attributed to problems arising from the low disassociation temperature of gallium nitride. Conventional powder metallurgy methods for the fabrication of compacts employ a combination of relatively high temperatures, in the order of 1,000° C., and high pressures in the order of 20–50 Kpsi. However gallium nitride has a disassociation temperature of approximately 850° C. at atmospheric pressure, and the disassociation of gallium nitride molecules brings about the venting of nitrogen gas and the reformation of gallium metal or (if oxygen is present) gallium oxide. As a result prior art attempts to make gallium nitride targets have resulted in compacts characterized by numerous pockets of gallium metal, and/or gallium oxide, and by voids resulting from the venting of disassociated nitrogen.

Experience has shown the necessity of producing sputtering targets of high density, whatever their composition, that are substantially free of material clusters and so-called black spots or holes. When targets having insufficient density are sputtered, overlarge particles in sizes from 0.70 $\mu$m to 100 $\mu$m may be ejected from the target and deposited on the thin film, causing a variety of defects that render the deposited material unsuitable for use in electronic applications. Accordingly the inability to fabricate gallium nitride sputtering targets that meet required density criteria has precluded the use of such targets in processes for fabricating electronic devices employing gallium nitride layers or components.

Extremely complex and expensive methods exist for depositing gallium nitride onto substrates, such as the molecular beam epitaxy method disclosed in U.S. Pat. No. 5,633,192 to Moustakas et al., and the chemical vapor deposition methods disclosed for example in U.S. Pat. No. 5,334,277 to Nakamura. However the prohibitive cost and the complexity of these methods render them effectively unusable for the fabrication of gallium nitride sputtering targets.

It is accordingly an object of the present invention to provide a method for the preparation of nitride compacts having the density and purity required for sputtering targets applications. More specifically it is an object of the invention to provide a method enabling the preparation of nitride targets that have improved physical characteristics, including a density in excess of 75% of theoretical maximum, a homogeneous nitride composition free of atomic metal or other contaminants, and improved mechanical characteristics that allow the target to be readily machined, ground, and polished.

It is a further object of the invention to provide a method for the preparation of nitride targets based on the conventional powder metallurgy technique of hot pressing, using as starting material a mixture of powders of a Ill-V nitride and of a nitrogen rich salt, preferably an ammonia salt.

SUMMARY OF THE INVENTION

It has been discovered that high density substantially pure gallium nitride sputtering targets may be made using, conventional powder metallurgy techniques such as hot pressing, by employing as a starting material a powder mixture of gallium nitride and an ammonia salt, such as ammonium carbonate $((NH_4)_2CO_3)$ or ammonium nitrate $((NH_4)NO_3)$. These nitrogen rich ammonia salts have disassociation temperatures somewhat below that of gallium nitride, at which they volatilize fully as simple gases, e.g., nitrogen, hydrogen and carbon dioxide in the case of ammonium carbonate.

In the method of the present invention, the ammonia salt volatilizes and serves as a source of free nitrogen radicals in the course of the sintering operation, which are available to replace any nitrogen atoms lost through disassociation by gallium nitride molecules.

Another benefit of the present method is that the volatilization of all products of the ammonia salt through disassociation is an endothermic process, and it generates an energy absorbing medium that cools the surrounding nitride and thereby acts to minimize the extent of nitride disassociation. Still another benefit is that the venting from the compact of the gases constituting the disassociation products of the ammonia salt results in a substantially pure nitride target.

Gallium nitride targets made using the method of the invention demonstrate densities in excess of 75% of theoretical maximum, and high purity, including a virtual absence of metallic gallium or of any contaminate. Such targets have been used successfully to coat sapphire substrates using pulsed laser ablation sputtering techniques, enabling the deposition of thin coatings of gallium nitride of good quality, usable for a variety of industrial applications, including optical, electro-optical and microelectronic device fabrication.

The method of the present invention is generally applicable to the fabrication of Group III nitride compacts. In each case there should be used as an additive a nitrogen rich salt that volatilizes endothermically at a temperature somewhat below the disassociation temperature of the selected nitride. In addition doped targets may readily be fabricated by adding a powder of a selected N type or P type dopant to the nitride and salt powder mixture used as the starting material. Such dopants are well known in the art and do not require listing here.

Specifically it has been discovered that a gallium nitride sputtering target with superior characteristics can be efficiently and inexpensively produced when a mixture of gallium nitride powder and ammonium carbonate powder is placed in a suitable die, rapidly heated to a temperature in the range between 700° C. and 900° C. while being simultaneously compacted by the application of pressure in the range of 20 to 50 Kpsi in a nitrogen rich atmosphere, and, following a period of some 15 minutes at maximum pressure and temperature, rapidly quenched to room temperature prior to the release of the applied pressure.

The superior characteristics resulting from the use of the method of the invention include a higher density, higher purity including an absence of pockets of gallium metal or of voids, and substantially improved mechanical strength permitting the easy machining, grinding or polishing of the target prior to placing it in a variety of coating systems.

DETAILED DESCRIPTION OF ILLUSTRATIVE EMBODIMENTS OF THE INVENTION

Figure 1:
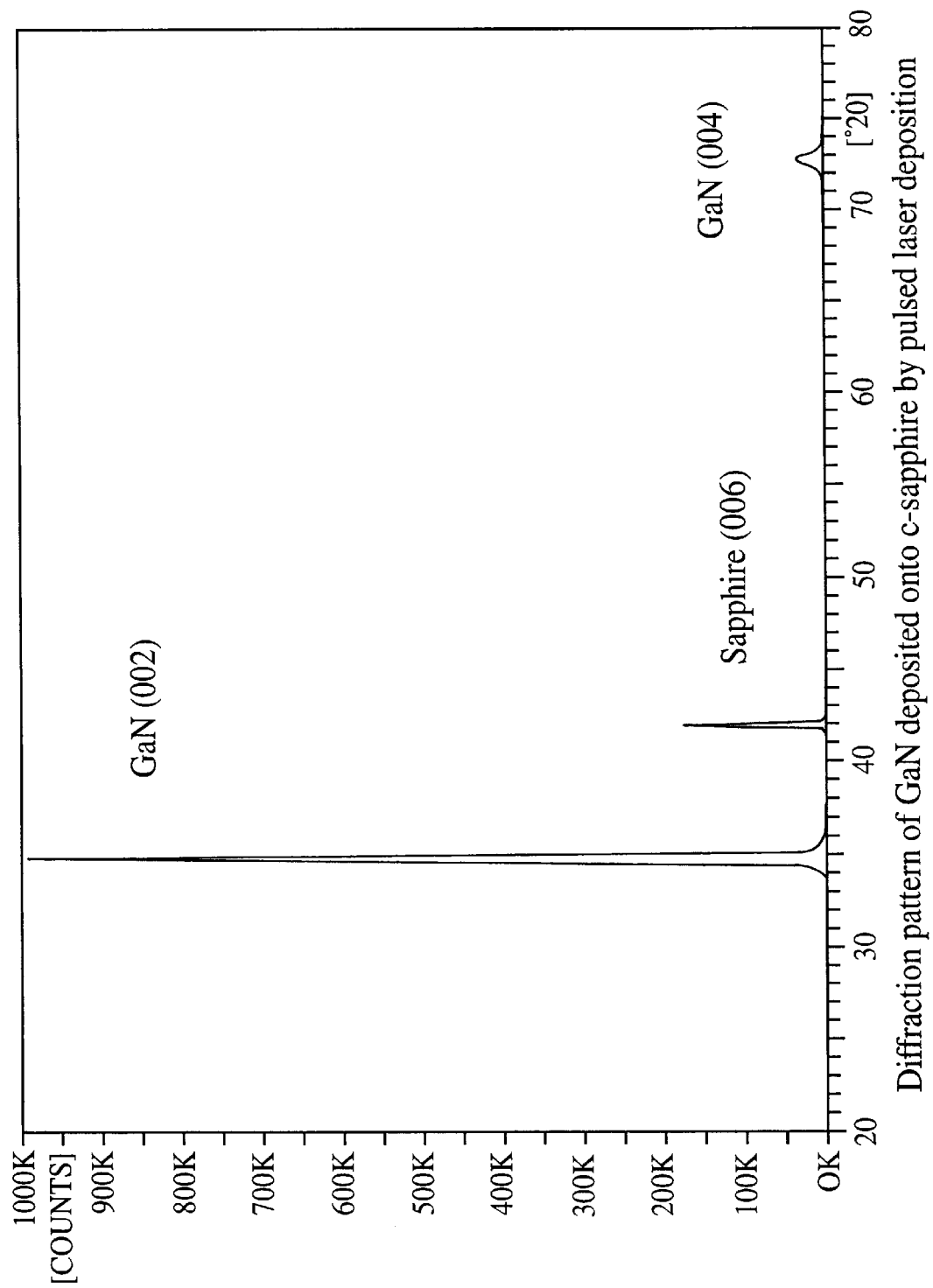
FIG. 1: X-ray diffraction trace of gallium nitride film deposited on a sapphire substrate by pulsed laser ablation of gallium nitride target.

The present invention is directed to the fabrication of nitride sputter targets by powder metallurgy methods, whereby a nitride powder and a powder of a nitrogen rich salt are mixed, and then sintered to high density under specific temperature and pressure conditions, as described in detail below. The method of the present invention enables the fabrication of nitride compacts that are suitable for use as sputter targets in low temperature sputter deposition techniques, to produce doped or undoped coatings and layers of the selected nitride, thereby enabling the fabrication of a variety of useful devices including semiconductor devices, optical devices and electro-optical devices.

According to the invention, gallium nitride sputtering targets are made from gallium nitride powder and a small proportion of a second powder consisting of an ammonia salt that disassociates into nitrogen gas and other volatile gases at temperatures in the range between 600 and 900° C. Such salts include without limitation ammonium carbonate ($(NH_4)_2CO_3$), ammonium bicarbonate, ammonium nitrate, and organic ammonia salts such as ammonium acetate. The improvement of the present invention therefore results from providing for the replacement of a portion of the gallium nitride powder with a powder of an ammonium salt. It has been found that the addition of a small proportion of ammonia salt, preferably in a range between 3% and 15% by weight, but possibly between 2% and 20% greatly improves the characteristics of the target, and it is especially effective in avoiding the formation in the target of pockets of gallium metal or oxide, and of voids that result in excessive porosity and low mechanical strength of the target.

The target fabrication method of the invention may be therefore be summarized to comprise forming a powder mixture composed as aforesaid; placing said powder mixture in a heat resistant die, and then heating said die in a heat resistant chamber, to a temperature in the range of 600–1,200° C., while a compaction force in the range of 20–50 Kpsi is applied by means of a ram, and preferably a pure nitrogen atmosphere is maintained in the chamber. These temperature and pressure conditions are maintained for a sufficient period, in the order of 10 to 20 minutes, to form a compact, and the die containing the compact is then quickly shock cooled by quenching. The ram-applied pressure is then released and the compact is removed from the chamber. The resulting compact is easily machined to provide one or more targets having a density in excess of at least 75% of theoretical density and low particulate transferring upon sputtering.

The powders of starting materials, for example gallium nitride and ammonium carbonate, should have purity as high as possible, for example 99 percent or, preferably 99.99 percent, and should have a spherical particle size smaller than about 20 micron, and preferably about 10 $\mu$m. The preferred gallium nitride source is a powder having a size range 5–20 $\mu$m.

Conventional hot press equipment employed for powder metallurgical processes is suitable for practicing the method of the present invention. In particular, there may be used a standard hot press modified to accommodate an open cycle cryogenic cooling, that has a 0 to 55 Kpsi variable load ram, an induction coil heater capable of heating a die in the chamber to a temperature in a range from 400 to 1,200° C., and a cooling system capable of shock cooling of materials in the die.

The gallium nitride powder and the ammonium carbonate powder are intimately mixed in any suitable conventional manner in the desired proportions. To avoid oxidation the mixing operation is preferably carried out in the presence of nitrogen or other inert gas, using reagents from vials freshly opened in the inert gas atmosphere.

The required amount of the mixture is placed in the cavity of a resistively heated pressing die, for example a graphite die with a cavity having a configuration and dimensions such that the configuration of a sputtering target with desired dimensions is produced. Configurations of targets may include planar, cylindrical and annular targets of varying dimensions. For example, to make wafer shaped cylindrical targets, the die is a hollow graphite cylinder with sufficient strength to contain and withstand pressing forces.

The loaded die is placed in the chamber of an atmosphere controllable hot press. The press has at least one movable pressing ram made of graphite and movable to contain the powder mixture in the die and to produce a compact with substantially the configuration and dimensions of the desired sputtering target. The ram or rams are adapted for application of axial compaction forces to the material in the cavity and can be locked in position. The chamber of the press also contains a heater such as an induction heater that substantially envelops the die, and shock-cooling means such as an open cycle heat exchanger operatively connected to a source of coolant such as liquid nitrogen. It will be understood that although the description will proceed with reference to the die having one movable pressing arm, the die may have two opposing, movable pressing rams.

Initially, a light containment pressure under 100 psi is applied to the contents of the die with at least one of the rams. The chamber atmosphere is promptly evacuated and back-filled preferably with pure nitrogen gas to a pressure in the range between atmospheric pressure and 100 psi. The die is then step heated by the heating means. In the fabrication of a gallium nitride target, employing an ammonium carbonate additive, the die is rapidly heated to a temperature of approximately 800° C., and preferably 840° C., as the ram compresses the powder to a maximum pressure between 24 and 32 Kpsi. The desired ultimate temperature of 840° C. and the applied compaction force in the range of 24–32 Kpsi are maintained for a period of 10 to 20 minutes, which is sufficient time to achieve maximum density, and to allow the removal by volatilization of the gases produced by the disassociation of the ammonium carbonate components of the mixture.

At the close of the condition maintaining stage, the ram or rams are locked in their final positions and the die is rapidly shock cooled to room temperature, by the circulation of liquid nitrogen through a circulation system that substantially surrounds the die and is operatively connected to a source of liquid nitrogen. A back-filling flow of pure nitrogen gas through the chamber continues to be maintained as this quenching of the die is carried out. As the system cools, the ram or rams contract away from the compact due to differential thermal contraction. The cooled die is removed from the chamber and the compact is retrieved from the die and stored in a nitrogen or inert gas atmosphere.

Subsequently, and preparatory for use as a sputter target, the compact may readily be machined or ground to the dimensions desired for the sputter target, using ordinary diamond-tipped tools. It is essential that the process be performed in a manner that insures no contamination is transferred to the target, by using sterile tools and a slow nitrogen gas stream directed on the cutting surface.

Sputtering targets made according to the present invention have improved characteristics as compared to targets made according to the prior art. These improved characteristics include:

(1) substantially increased density at or above 75% theoretical density;

(2) low content of contaminants, particularly no gallium metal or gallium oxide;

(3) low porosity, substantially free of voids;

(4) low gas content especially oxygen or hydrogen;

(5) good mechanical strength and machinability; and (6) low particulate transportation upon sputtering.

Two examples described below set forth specific settings and parameters used to achieve the fabrication of gallium nitride targets. In both examples a gallium nitride target is prepared using ammonium carbonate as an additive, and using as the processing equipment a single axis programmable hot-press, equipped with means for atmosphere and temperature control substantially as described above. These examples are included only as examples, and are not intended to be limiting. Variations in starting materials, equipment and specific settings will be apparent to the practitioner skilled in the art to fabricate nitride targets for specific applications.

EXAMPLE 1

Gallium Nitride Target

The preferred starting materials are by weight 95% gallium powder and 5% ammonium carbonate powder. The gallium nitride powder is preferably 99.9% pure, screen sifted to average 10 micron average diameter. The ammonium carbonate additive is also preferably a powder of 99.9% purity and 10 micron average diameter. A weight ratio of 5% ammonium carbonate and 95% gallium nitride is mixed in a rotating container for 5 minutes, to obtain the starting material composition. The target fabrication method comprises the following steps.

(a) The homogeneous powder mixture of gallium nitride and ammonium carbonate is placed in a 2.00 inch diameter, resistively heated graphite pressing die;

(b) The die containing the mixture is placed in the chamber of the hot press at room temperature (298K), and a minor containment pressure is applied to the die;

(c) The chamber of the hot press is vented by the introduction of pure nitrogen gas at atmospheric pressure and the chamber is sealed;

(d) A compaction force is gradually applied to the mixture in the die, eventually raising the pressure applied to the die to a maximum of 24 Kpsi;

(e) Beginning simultaneously with the application of said compaction force, rapid heating of the die is initiated, and continued at least until the die reaches the temperature of 840° C.;

(f) The conditions of 24 Kpsi pressure and 840° C. temperature are then maintained constant for 15 minutes;

(g) A rapid cool down or quenching of the die is then effected, back to room temperature, over about a four minute period, by passing liquid nitrogen through heat exchanger coils surrounding the die, while maintaining a ram pressure of 24 Kpsi on the contents of the die;

(k) Upon return of the die temperature to room temperature, the compaction force is released and the ram pressure on the contents of the die returned to ambient;

(l) The die is then removed from the chamber, and the cooled compact is removed from the die and stored in a nitrogen gas environment.

EXAMPLE 2

Doped Gallium Nitride Target

The preferred starting materials are by weight 90% gallium powder, 5% ammonium carbonate powder, and 5% of one of the following: Mg, Zn, Cd, Hg, Ca, Be, C, or AS. The gallium nitride powder is preferably 99.9% pure, screen sifted to average 10 micron average diameter. The ammonium carbonate and the other additive are also preferably powders of 99.9% purity and 10 micron average diameter. A weight ratio of 5% ammonium carbonate, 5% Mg (or other dopant from the above list), and 90% gallium nitride is mixed in a rotating container for 5 minutes, to obtain the starting material composition. The target fabrication method comprises the following steps.

(a) The gallium powder, ammonium carbonate powder, and dopant powder are mixed to form a homogeneous powder mixture, which is placed in a 2.00 inch diameter, resistively heated graphite pressing die;

(b) The die containing the mixture is placed in the chamber of the hot press at room temperature (298K) and a minor containment pressure is applied to the die;

(c) The chamber of the hot press is vented by the Introduction of pure nitrogen gas at atmospheric pressure and the chamber is sealed;

(d) A compaction force is gradually applied to the mixture in the die, eventually raising the pressure in the die to a maximum of 24 Kpsi.

(e) Beginning simultaneously with the application of the compaction force, rapid heating of the die is initiated, and continued at least until the die reaches the temperature of 840° C.;

(f) The conditions of 24 Kpsi pressure and 840° C. temperature are then maintained constant for 15 minutes;

(g)Then, over a time ramp approximately four minutes long, a rapid cool down or quenching of the die is effected, back to room temperature (298K), by passing liquid nitrogen through the heat exchanger while maintaining a die pressure of 24 Kpsi;

(h) Upon return of the die temperature to room temperature, the compaction force is released and the ram pressure applied to the contents of the die is returned to ambient;

(i) The cooled compact is then removed from the die and stored in a nitrogen gas environment.

The porosity of the sputtering targets is determined using the Archimedean liquid volume displacement method, as follows: The target is weighed, encapsulated in a thin coating of a non-contaminating gel, and submerged in a liquid. A scale located on the vessel wall indicates the amount of liquid displaced by the target, in cubic centimeters, which equals the volume of the target. A theoretical 100% density weight is calculated by multiplying the volume thus determined by the known density of gallium nitride and other constituents, weighted pro rata, and the ratio of the actual measured weight to the 100% density weight establishes the density ratio.

X-ray diffraction may be used to characterize the constituents of the target, and also to characterize the constituents and the crystalline orientation of coatings applied by sputtering of the target onto a suitable substrate. FIG. 1 is an X-ray diffraction trace of a gallium nitride coating applied to a sapphire substrate by pulsed laser ablation of a target made according to the invention. It shows that gallium nitride is the sole discernible constituent material in the target, and that the gallium nitride is C-axis oriented and rotated 60 degrees with respect to the sapphire.

I claim:

1. A substantially pure gallium nitride compact having a density in excess of 75% of maximum theoretical density.

2. The compact of claim 1 formed from a powder mixture initially containing a nitrogen-containing salt.

3. The compact of claim 1 formed from a powder mixture containing gallium nitride.

4. The compact of claim 3 formed from a powder mixture initially containing an ammonia salt.

5. The compact of claim 3 formed from a powder mixture initially containing ammonium carbonate.

6. A method of fabricating a gallium nitride compact, by hot pressing a mixture comprising a powder of a gallium nitride compound and a powder of a nitrogen-containing salt.

7. The method of claim 6 wherein said method comprises the steps of:

(a) heating said mixture to a temperature sufficient to cause the volatilization of the salt while simultaneously applying a compaction force to said mixture;

(b) maintaining said temperature and said compaction force for a period of time sufficient to sinter the mixture;

(c) cooling said mixture; and (d) releasing said compaction force.

8. The method of claim 7 wherein an atmosphere of pure nitrogen is maintained throughout the heating and cooling steps.

9. The method of claim 7 wherein said temperature is between 800° and 900° C.

10. The method of claim 7 wherein said temperature is maintained between 800° and 900° C. for a minimum of 10 minutes.

11. The method of claim 7 wherein the compaction force applied to the mixture reaches a value between 20 and 50 Kpsi.

12. The method of claim 11 wherein said compaction force is maintained at its maximum value between 20 and 50 Kpsi while the temperature of the mixture is maintained between 800° C. and 900° C.

13. The method of claim 7 wherein said sintering is carried out using a hot press apparatus.

14. The method of claim 6 wherein said nitrogen containing salt is an ammonia salt.

15. The method of claim 14 wherein said ammonia salt is ammonium carbonate.

16. The method of claim 6 wherein a dopant powder selected to obtain a P doped compact is mixed with the gallium nitride and the salt to form said homogeneous mixture.

17. The method of claim 6 wherein a dopant powder selected to obtain an N doped compact is mixed with the gallium nitride and the salt to form said homogeneous mixture.

18. A starting material composition for the fabrication of compacts comprising gallium nitride compounds, wherein said composition is a mixture comprising:

(a) a powder of a gallium compound; and (b) a powder of a nitrogen-containing salt.

19. The starting material composition of claim 18 wherein the selected salt is an ammonia salt.

20. The starting material composition of claim 18 wherein the selected salt is ammonium carbonate.

21. The starting material composition of claim 18 wherein the powders forming the mixture have a size range under 20 microns.

22. The starting material composition of claim 19 wherein the proportion of ammonia salt in said mixture is between 2 and 20% by weight.

23. The starting material composition of claim 18 wherein said mixture additionally comprises a powder of a dopant selected to obtain a P doped compact.

24. The starting material composition of claim 18 wherein said mixture additionally comprises a powder of a dopant selected to obtain an N doped compact.

25. A gallium nitride compact formed by hot pressing a mixture of gallium nitride powder and ammonium carbonate powder.

26. The compact of claim 25 wherein said mixture was hot pressed by heating the mixture at a temperature sufficient to cause the ammonium carbonate powder to volatilize and below the disassociation temperature threshold of gallium nitride, while applying a compaction force to the mixture.

* * * * *